US012723901B2

(12) United States Patent
Tritschler et al.

(10) Patent No.: US 12,723,901 B2
(45) Date of Patent: Sep. 1, 2026

(54) METHOD FOR CALIBRATING A SENSOR, PROCESSING UNIT AND SENSOR SYSTEM

(71) Applicant: Robert Bosch GmbH, Stuttgart (DE)

(72) Inventors: Patrick Tritschler, Engen (DE); Torsten Ohms, Vaihingen (DE); Mirko Hattass, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 395 days.

(21) Appl. No.: 18/363,845

(22) Filed: Aug. 2, 2023

(65) Prior Publication Data

US 2024/0077342 A1 Mar. 7, 2024

(30) Foreign Application Priority Data

Sep. 1, 2022 (DE) ..................... 10 2022 209 080.2

(51) Int. Cl.
*G01D 21/00* (2006.01)

(52) U.S. Cl.
CPC .................................... *G01D 21/00* (2013.01)

(58) Field of Classification Search
CPC ...... G01D 21/00; G01D 18/00; G01D 18/002; G01R 31/2829; G01R 33/0035; G01R 35/005; G01P 21/00
See application file for complete search history.

(56) References Cited

U.S. PATENT DOCUMENTS 5,321,638 A * 6/1994 Witney ................... G01P 21/00 73/1.88
5,654,907 A * 8/1997 Lange .................. G05B 13/048 702/104
2013/0114965 A1 5/2013 Kuo et al.
2014/0117982 A1* 5/2014 Budiarto ................ G01B 7/105 324/229
2023/0332926 A1* 10/2023 Kim ....................... G01D 3/028

FOREIGN PATENT DOCUMENTS

DE 102018201154 A1 7/2019
EP 3260999 A1 12/2017
WO 2014183948 A2 11/2014

* cited by examiner

*Primary Examiner* — Manuel A Rivera Vargas
(74) *Attorney, Agent, or Firm* — NORTON ROSE FULBRIGHT US LLP

(57) ABSTRACT

A method for calibrating a sensor of a sensor system. A plurality of sensors structurally identical to the sensor of the sensor system and a general sensor model are provided. An inner optimization step is subsequently carried out for each of the structurally identical sensors. During the inner optimization step, a sensor-specific sensor model is initialized using the general sensor model and a sensor-specific model parameter is subsequently optimized based on measured data of the sensor. The sensor-specific sensor model is adapted with the aid of the sensor-specific model parameter. An outer optimization step is then carried out. In this step, the sensor-specific sensor models adapted for each sensor are used in order to optimize the general sensor model. The general sensor model is stored in a memory of the sensor system.

10 Claims, 4 Drawing Sheets

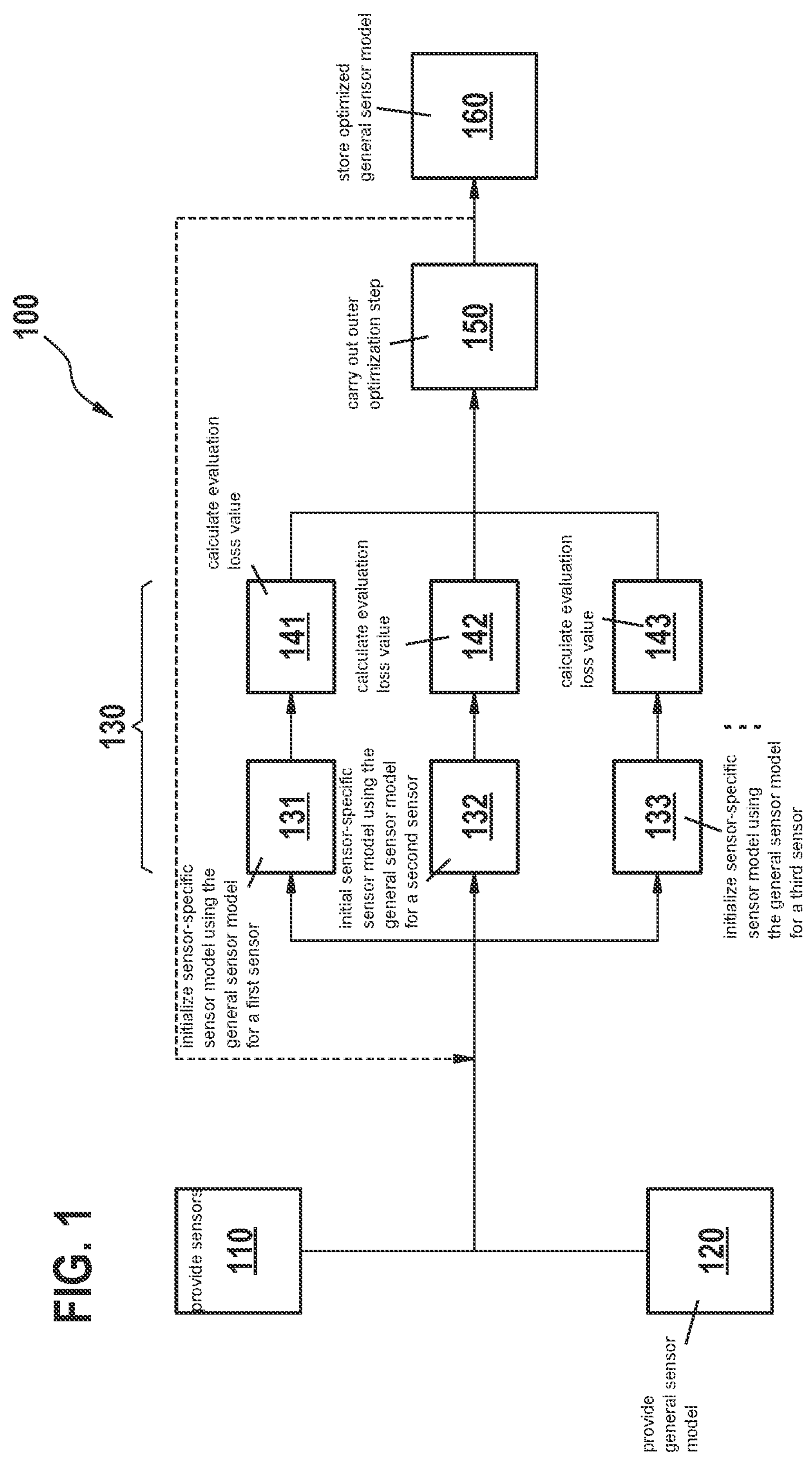
FIG. 1
100
provide sensors
110
120
provide general sensor model
130
initialize sensor-specific sensor model using the general sensor model for a first sensor
131
initial sensor-specific sensor model using the general sensor model for a second sensor
132
initialize sensor-specific sensor model using the general sensor model for a third sensor
133
calculate evaluation loss value
141
calculate evaluation loss value
142
calculate evaluation loss value
143
carry out outer optimization step
150
store optimized general sensor model
160

100
170
180
190
initialize sensor-specific sensor model using the general sensor model
optimize sensor-specific model parameter
store sensor-specific sensor model 200
sensor system
processor
220
processing unit
222
221
201
sensor
210
output
input
memory
223

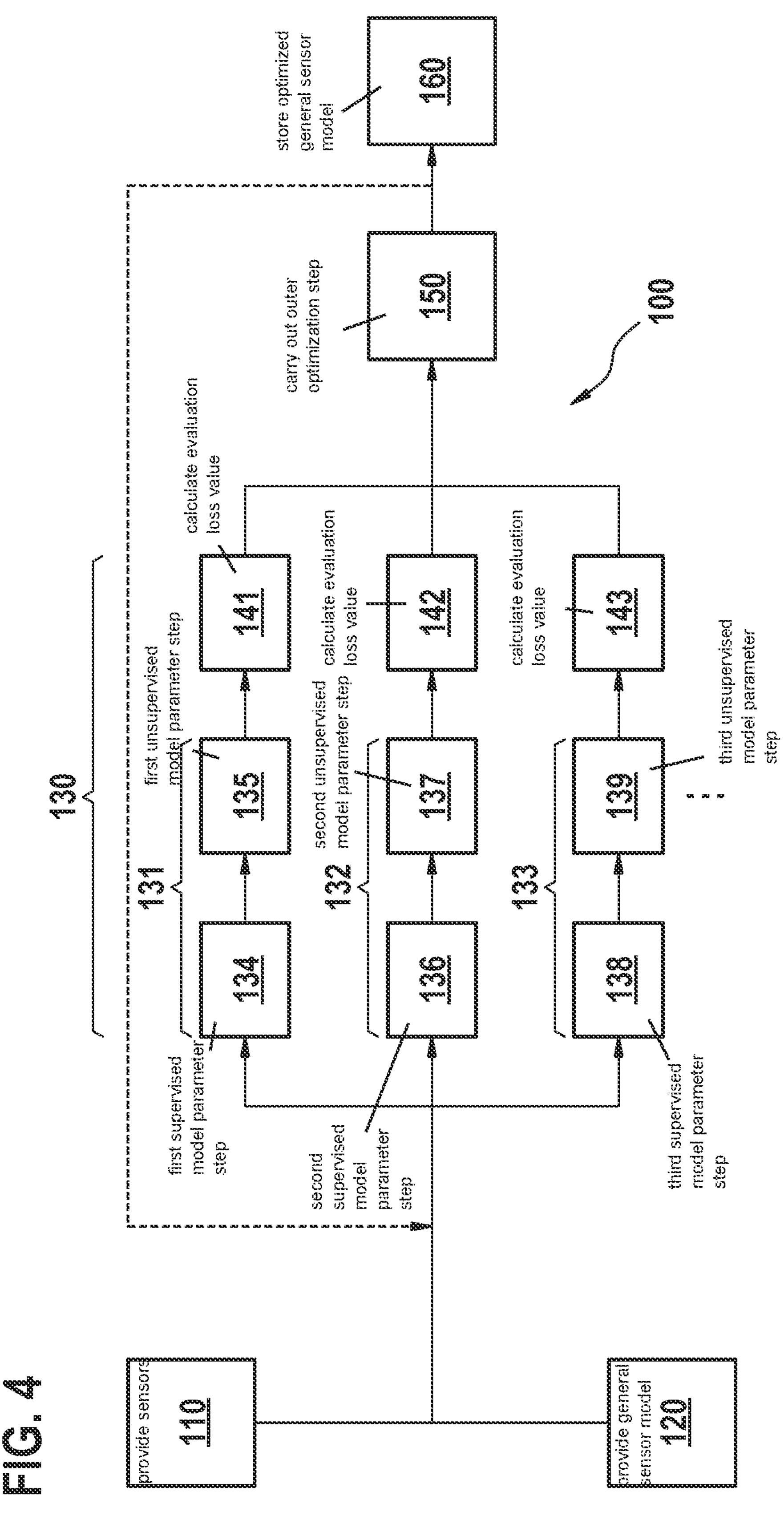

FIG. 4
provide sensors
110
provide general sensor model
120
130
131
132
133
first supervised model parameter step
134
first unsupervised model parameter step
135
second supervised model parameter step
136
second unsupervised model parameter step
137
third supervised model parameter step
138
third unsupervised model parameter step
139
calculate evaluation loss value
141
calculate evaluation loss value
142
calculate evaluation loss value
143
carry out outer optimization step
150
store optimized general sensor model
160
100 sensor development start
301
produce and calibrate
302
calibration data definition
303
test data and calibration data recording
304
model creation
305
development completed?
306
300
sensor manufacture start
307
mass production
308
delivery
309
sensor application start
310
installation
311
calibration
312

METHOD FOR CALIBRATING A SENSOR, PROCESSING UNIT AND SENSOR SYSTEM

CROSS REFERENCE

The present application claims the benefit under 35 U.S.C. § 119 of German Patent Application No. DE 10 2022 209 080.2 filed on Sep. 1, 2022, which is expressly incorporated herein by reference in its entirety.

FIELD

The present invention relates to a method for calibrating a sensor, to a processing unit and to a sensor system.

BACKGROUND INFORMATION

Sensors are described in the related art, it being necessary to calibrate the sensors after their manufacture, since these invariably exhibit certain differences from one another. This calibration may be carried out on the basis of a mathematical model. Starting from a generalized model, the parameters of the model are adapted to individual sensors during the calibration process. For this purpose, the sensors adopt particular measuring points and the models are adapted via matching algorithms as a function of the measured values. If the sensors are installed, for example, soldered, in users, altered ratios may then occur and the original calibration is potentially no longer optimal. A user may now recalibrate the sensor. This recalibration is complex, however and potentially requires knowledge about the exact functioning of the sensor and of its calibration, which is not available to the user.

Adaptive methods are further available in the related art, in which a model is adapted to new conditions. In this case, for example, a meta-model is generated, which is simultaneously suitable for multiple different sensors. This meta-model may then be adapted to individual sensors. Training methods of neural networks are one application of these methods. The meta-model may be trained to be able to carry out an adaptation of the sensors using preferably few training data. The meta-model in this case is adapted to form a sensor-specific model. A conventional meta-adaptation algorithm for the training of artificial intelligence is the "Model-Agnostic Meta-Learning" algorithm (MAML). This algorithm is made up of two optimization steps, which adapt a model with the aid of a gradient training step. These are the inner optimization and the outer optimization. Using the inner optimization, a general model for sensors is adapted to a certain sensor, whereas the general model for sensors is optimized with the aid of the outer optimization. Both optimization steps may be carried out when training the artificial intelligence, whereas the adaptation step may be carried out with the aid of the inner optimization.

SUMMARY

An object of the present invention is to provide an improved method for calibrating a sensor, in which a sensor error is reduced. Further objects of the present invention are the provision of a processing unit for carrying out the method and a sensor system, which is able to carry out this method. These objects may be achieved with features of the present invention. Advantageous embodiments and refinements of the present invention are disclosed herein.

According to a first aspect, the present invention relates to a method for calibrating a sensor of a sensor system. According to an example embodiment of the present invention, the steps explained below are carried out. A plurality of sensors structurally identical to the sensor of the sensor system and a general sensor model are provided. The general sensor model in this case may be created based on theoretical considerations of how the sensor functions. The general sensor model may relate, in particular, to one sensor type, i.e. to all structurally identical sensors. An inner optimization step is subsequently carried out for each of the structurally identical sensors. In the inner optimization step, the general sensor model is used to initialize a sensor-specific sensor model and a sensor-specific model parameter is subsequently optimized based on measured data of the sensor. The general sensor model may also be referred to as a meta-model. The sensor-specific sensor model is adapted with the aid of the sensor-specific model parameter. An evaluation value loss is subsequently calculated for the sensor-specific sensor model. An outer optimization step is then carried out. In this step, the evaluation values calculated for each sensor are used to optimize a general model parameter of the general sensor model. The general sensor model is stored in a memory of the sensor system. The stored general sensor model may include, in particular, the general model parameter optimized in the outer optimization step.

This method may be used, in particular, during the development, but also during the production of a sensor system. By storing the general sensor model in a memory of the sensor system, the sensor system is able to be provided with a general sensor model, on the basis of which the sensor system processes measured data of a sensor of the sensor system with the aid of the general sensor model and more accurate output values are obtained as a result.

According to an example embodiment of the present invention, the method for calibrating the sensor of the sensor system uses an inner optimization step and an outer optimization step. In the inner optimization step, the sensor-specific sensor model is adapted based only on the measured data of one sensor. In the outer optimization step, the general sensor model may be adapted based on the evaluation value losses calculated for all sensors. This results in an efficient way of providing a general sensor model for all sensor systems during the manufacture of sensor systems.

According to a second aspect, the present invention relates to a processing unit for a sensor system. The processing unit includes an input for measured data of a sensor, a processor and a memory. A general sensor model optimized using the method according to the present invention is stored in the memory. The processor is configured to process measured data of the sensor based on the general sensor model. More accurate output values may be obtained as a result.

According to a third aspect, the present invention relates to a sensor system including a processing unit according to the present invention and a sensor connected at the input. The sensor system may be designed in such a way that both the sensor as well as the processing unit are part of an integrated circuit or that both the sensor as well as the processing unit are situated in a shared housing.

In one specific example embodiment of the processing unit of the present invention, the processor is further configured, based on measured data of the sensor received via the input, to carry out an inner optimization, in which a sensor-specific sensor model is initialized using the general sensor model and a sensor-specific model parameter is subsequently optimized based on the measured data of the sensor. Multiple sensor-specific model parameters may also be provided, which are optimized based on the measured data. This may then take place in each case for each sensor-specific model parameter using the methods described below. The sensor-specific sensor model is adapted with the aid of the sensor-specific model parameter and is stored in the memory. This makes it possible, for example, after the installation of the sensor system and the changes to the sensor potentially associated therewith, to carry out a calibration of the sensor system and thus to obtain more accurate output values. The calculation of the evaluation loss value included in the inner optimization step for multiple sensors may be omitted here, since no further outer optimization is carried out. The changes to the sensor in this case may be caused, for example, by temperatures during soldering or by stress effects.

In one specific example embodiment of the method of the present invention, an inner optimization step is carried out after the installation of the sensor system. In the inner optimization step, the general sensor model is used to initialize a sensor-specific sensor model and a sensor-specific model parameter is subsequently optimized based on measured data of the sensor. The sensor-specific sensor model is adapted with the aid of the sensor-specific model parameter. The sensor-specific sensor model, i.e., in particular, the adapted sensor-specific sensor model, is subsequently stored in the memory. In this case, the general sensor model initially stored in the memory may be replaced by the sensor-specific sensor model. Alternatively, it may be provided that the general sensor model remains in the memory and, in addition, the sensor-specific sensor model is stored in the memory. This makes it possible, for example, after the installation of the sensor system and the changes to the sensor potentially associated therewith, to carry out a calibration of the sensor system and thus to obtain more accurate output values. The changes to the sensor in this case may be caused, for example, by temperatures during soldering or by stress effects.

In this specific embodiment of the present invention, it may be provided that the majority of the sensors structurally identical to the sensor of the sensor system are used to ascertain the general sensor model, and the sensor installed in the sensor system is one different from the sensors used during the ascertainment of the general sensor system. The inner optimization step after the installation is thus carried out using measured data of a different sensor than in the inner optimization step and the outer optimization step prior to the installation.

In one specific embodiment of the method of the present invention, subsequent to the storage of the sensor-specific sensor model in the memory, the general sensor model and/or an adaptation algorithm is/are removed from the memory. In this way, memory space in the memory may be freed and, if necessary, may be used for other tasks, for example, for buffering output values.

In one specific embodiment of the method of the present invention, the implementation of the inner optimization step and the implementation of the outer optimization step are repeated using the optimized general sensor model. This repetition takes place multiple times, if necessary. The storing of the general sensor model in the memory of the sensor system may then take place once the repetition or the repetitions of the inner optimization step and of the outer optimization step has/have been carried out. This enables a more accurate adaptation of the general sensor model.

In one specific embodiment of the method of the present invention, the measured data of the sensor in the inner optimization step are calibration data. To optimize the sensor-specific model parameter, a loss function of a sensor error is taken into consideration. In this case, calibration data may be measured data that are present at the start of a typical application. For a magnetic field sensor, for example, the calibration data may relate to the earth's magnetic field if initially an outer magnetic field is not yet applied. For an acceleration sensor, the calibration data may relate to the gravitational acceleration if it may be assumed that the sensor or the sensor system is at rest.

In one specific embodiment of the method of the present invention, a mean squared deviation of a sensor error is used as a loss function. This enables a simple calculation of the mean squared deviation of the sensor error.

In one specific embodiment of the method of the present invention, measured data of the respective sensor are used when calculating the evaluation value loss, the measured data being base test data or calibration data and base measured data. The calibration data in this case may correspond to the calibration data explained in this context further above. The base test data may relate to measured data in the case of stress effects, which are produced, for example, as a result of the installation of the sensor or of the sensor system or as a result of environmental effects acting on the sensor system. For example, the base test data may include the measured values of the sensor changed as a result of the stress effects. An evaluation loss value is determined with the aid of the base test data or of the calibration data and the base test data. The evaluation loss value calculated with the aid of these data is used to optimize the general sensor model. This enables an efficient adaptation of the general sensor model.

In one specific embodiment of the method of the present invention, the inner optimization step takes place with the aid of a neural network. In one specific embodiment of the method, the outer optimization step takes place with the aid of a neural network. The networks of the outer and inner optimization steps in this case may have the same architecture in order to simplify the training.

BRIEF DESCRIPTION OF THE DRAWINGS

Exemplary embodiments of the present invention are explained based on the figures.

FIG. 1 schematically shows a flowchart of a method according to an example embodiment of the present invention.

FIG. 4 schematically shows a flowchart of a further method according to an example embodiment of the present invention.

DETAILED DESCRIPTION OF EXAMPLE EMBODIMENTS

Figure 2:
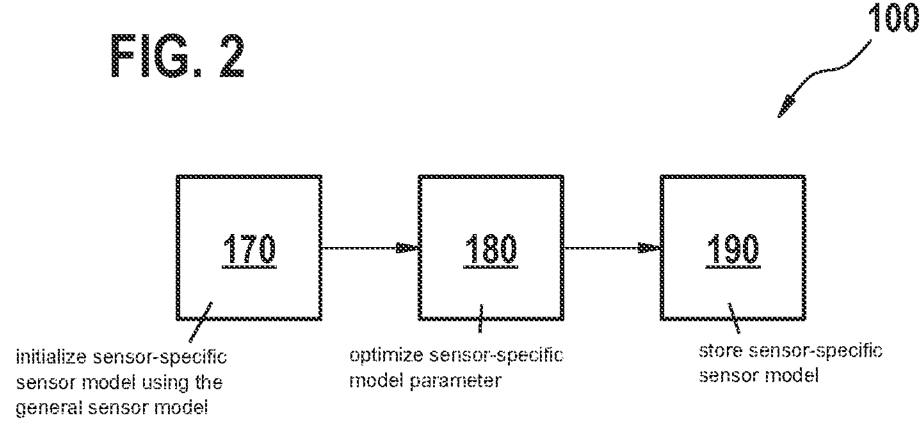
FIG. 2 schematically shows further method steps, according to an example embodiment of the present invention.

FIG. 1 shows a flowchart 100 of a method for calibrating a sensor of a sensor system. In a first method step 110, a plurality of sensors structurally identical to the sensor of the sensor system is provided. In a second method step 120, a general sensor model is provided. The general sensor model in this case may be created based on theoretical considerations of how the sensor functions. The general sensor model may relate, in particular, to one sensor type, i.e., to all structurally identical sensors. Alternatively, the sensor model may also be a general model, which is applicable for many differently designed sensors. First method step 110 and second method step 120 may be carried out simultaneously, as indicated in FIG. 1 by the fact that they are depicted one on top of the other. Furthermore, first method step 110 and second method step 120 may be carried out in an arbitrary order. Third method step 130 takes place next, in which an inner optimization step is carried out for each of the structurally identical sensors. Three branches for three sensors are represented in FIG. 1 for third method step 130, it being further indicated by dots that the method may also be carried out with more branches for more than three sensors. If necessary, the method is also possible for only two sensors. In third method step 130, a first model parameter step 131 and a first evaluation step 141 are carried out, which form a first branch of the aforementioned branches. In first model parameter step 131, a sensor-specific sensor model is initialized using the general sensor model for a first sensor and a sensor-specific model parameter is subsequently optimized based on measured data of the first sensor. The sensor-specific sensor model of the first sensor is then adapted with the aid of the sensor-specific model parameter. In first evaluation step 141, an evaluation loss value is calculated for the sensor-specific sensor model of the first sensor. In third method step 130, a second model parameter step 132 and a second evaluation step 142 are further carried out, which form a second branch of the aforementioned branches. In second model parameter step 132, a sensor-specific sensor model is initialized using the general sensor model for a second sensor and a sensor-specific model parameter is subsequently optimized based on measured data of the second sensor. The sensor-specific sensor model of the second sensor is then adapted with the aid of the sensor-specific model parameter. In second evaluation step 142, an evaluation loss value is calculated for the sensor-specific sensor model of the second sensor. In third method steps 130, a third model parameter step 133 and a third evaluation step 143 are further carried out, which form a third branch of the aforementioned branches. In third model parameter step 133, a sensor-specific sensor model is initialized using the general sensor model for a third sensor and a sensor-specific model parameter is subsequently optimized based on measured data of the third sensor. The sensor-specific sensor model of the third sensor is then adapted with the aid of the sensor-specific model parameter. In third evaluation step 143, an evaluation loss value is calculated for the sensor-specific sensor model of the third sensor. If more than three sensors are present, further model parameter steps and further evaluation steps may be similarly provided, which form further branches. In a fourth method step 150, an outer optimization step is subsequently carried out. The evaluation loss values calculated for each sensor (from first evaluation step 141, from second evaluation step 142 and from third evaluation step 143) are then used in order to optimize a general model parameter of the general sensor model. The general sensor model, in particular, the optimized general sensor model, is subsequently stored in a memory of the sensor system in a fifth method step 160. The stored general sensor model may include, in particular, the general parameter model optimized in the outer optimization step, i.e., in the fourth method step.

This method may be used, in particular, during the development, but also during the production of a sensor system. By storing the general sensor model in a memory of the sensor system, the sensor system may be provided with a general sensor model, with the aid of which the sensor model processes measured data of a sensor of the sensor system with the aid of the general sensor model and more accurate output values are obtained as a result.

The method for calibrating the sensor of the sensor system uses an inner optimization step (third method step 130) and an outer optimization step (fourth method step 150). In the inner optimization step, the sensor-specific sensor model is adapted based only on the measured data of a sensor. In the outer optimization step, the general sensor model may be adapted based on the evaluation value losses for all sensors. This results in an efficient way of providing a general sensor model for all sensor systems during the manufacture of sensor systems.

An exemplary embodiment of the method for calibrating the sensor of the sensor system is further indicated with the aid of a dashed line in FIG. 1, in which the implementation of the inner optimization step, i.e., of third method step 130, and the implementation of the outer optimization step, i.e. of the fourth method step 150, using the optimized general sensor model is optionally repeated. If necessary, the repetition takes place multiple times. The storing of the general sensor model in the memory of the sensor system may then take place once the repetition or the repetitions of the inner optimization step and of the outer optimization step has/have been carried out. In this way, it is possible to further improve the general sensor model before it is stored in the memory. This enables a more accurate adaptation of the general sensor model.

In one exemplary embodiment, the inner optimization step, i.e., third method step 130, takes place with the aid of a neural network. In one exemplary embodiment, the outer optimization step, i.e., fourth method step 140, takes place with the aid of a neural network. As an alternative to neural networks, it is also possible to use twofold differentiable functions. Combinations are also possible and thus also hybrid models such as hybrid neural networks.

In one exemplary embodiment, the measured data of the respective sensor in the inner optimization step, i.e., in third method step 130 and, in particular, in model parameter steps 131, 132, 133, are calibration data. To optimize the sensor-specific model parameter, in particular, in evaluation steps 141, 142, 143, a loss function of a sensor error is taken into consideration. Calibration data in this case may be measured data, which are present at the start of a typical application. For a magnetic field sensor, the calibration data may relate, for example, to the earth's magnetic field if initially an outer magnetic field is not yet applied. For an acceleration sensor, the calibration data may relate to the gravitational acceleration if it may be assumed that the sensor or the sensor system is at rest. The sensor-specific models in this case may have, for example, a parameter $\phi_i$. The index i in this case stands for the different sensors. The measured data are input into the sensor-specific model in model parameter steps 131, 132, 133 in order to obtain output data. The efficiency is subsequently determined, this potentially entailing a sensor error being preferably minimized in order to determine the evaluation loss value. This may take place, for example, with the aid of a loss function such as the mean squared error of a sensor error $L_{Ti,DC}^{inner}$. The sensor-specific model parameters may be subsequently changed with the aid of a gradient determination, for example, during a training step of the neural network with the aid of the formula:

$$\phi_i = \phi_i - \alpha\nabla\phi i \; L_{Ti,DC^{inner}}(f_{\phi i})$$

DC in this case are the calibration data. α is a scaling parameter and may correspond to an inner learning rate. It may be provided to use only data for the inner optimization step that are present at the start of a typical application, i.e., for example, the calibration data DC. These may, for example, be sensor-specific signals in the rest position of the sensor. It may be provided to repeat this step for a predefined number of repetitions for each sensor or for each parameter $\phi_i$.

Model parameter steps 131, 132, 133 in this case may be supervised model parameter steps 131, 132, 133 or unsupervised model parameter steps 131, 132, 133. In the case of supervised model parameter steps 131, 132, 133, real measured data, recorded, for example, using a calibration sensor, are available and the evaluation loss value is determined based on the real measured data. In the case of unsupervised model parameter steps 131, 132, 133, real measured data are available and the evaluation value loss must be determined without real measured data, for example, with the aid of a permanently defined loss function or with the aid of network parameter change losses.

In one exemplary embodiment, measured data of the respective sensor are used in the calculation of the evaluation loss value, the measured data being base test data or calibration data and base test data. In this case, the evaluation loss value $L_{Ti,DC+DB}^{eval}$ may be determined. DB in this case are the base test data. The base test data DB may be measured data in the case of stress effects in the different conditions. DC are the above-described calibration data.

A general sensor model is subsequently found for all sensors with the aid of the outer optimization step, i.e., of fourth method step 140. The general sensor model may be referred to as a meta-model. This may take place by adding together and averaging the efficiency of the sensor-specific models and by adapting the general sensor model with the aid of this value, for example, via a training step. In the process, a gradient may be formed, for example, for each evaluation loss value, the gradients being subsequently added together and averaged. The resulting gradient values may be scaled via a parameter β, which may correspond to an outer learning rate. Model parameters θ of the general sensor model may then be adapted as follows:

$$\theta = \theta - \beta 1/T \sum \nabla\phi_i L_{Ti,C+DB^{eval}}(f_{\phi i})$$

In this case, the gradients are calculated on the basis of the evaluation loss value. Thus, the aim of the algorithm is to maximize the efficiency of the sensor-specific models. It should be noted, however, that these sensor-specific models are created only with the aid of the calibration data. Since the calibration data are usually significantly fewer than the base test data, it is possible with the aid of few data to achieve a good performance on the basis of all data (base test data and calibration data). This makes the learning of the calibration step possible. It may be provided that the model parameter is initially randomly selected. It may further be provided to repeat the adaptation of model parameter θ until an abort criterion is fulfilled.

FIG. 2 shows a flowchart 100 of further optional method steps, which may be carried out subsequent to the method explained in conjunction with FIG. 1. In a sixth method step 170, a sensor-specific sensor model is initialized using the general sensor model. The general sensor model in this case may be extracted from the memory. In a seventh method step 180, a sensor-specific model parameter is optimized based on measured data of the sensor, the sensor-specific sensor model being adapted with the aid of the sensor-specific model parameter. This may take place, for example, with the aid of a step, similarly to above-described model parameter steps 131, 132, 133. Measured data of the sensor, which correspond to the calibration data, in particular, may be used for this purpose. In an eighth method step 190, the sensor-specific sensor model is stored in the memory. It may be provided, in particular, that the calibration data are adapted to this application and mainly measured data in known, recurring conditions (gravitational acceleration for acceleration sensors, earth's magnetic field for magnetic field sensors, etc.) are used as calibration data.

In one exemplary embodiment, the general sensor model and/or an adaptation algorithm is/are further removed from the memory in eighth method step 190. In this way, memory space in the memory may be freed and, if necessary, may be used for other tasks, for example, for buffering output values.

Figure 3:
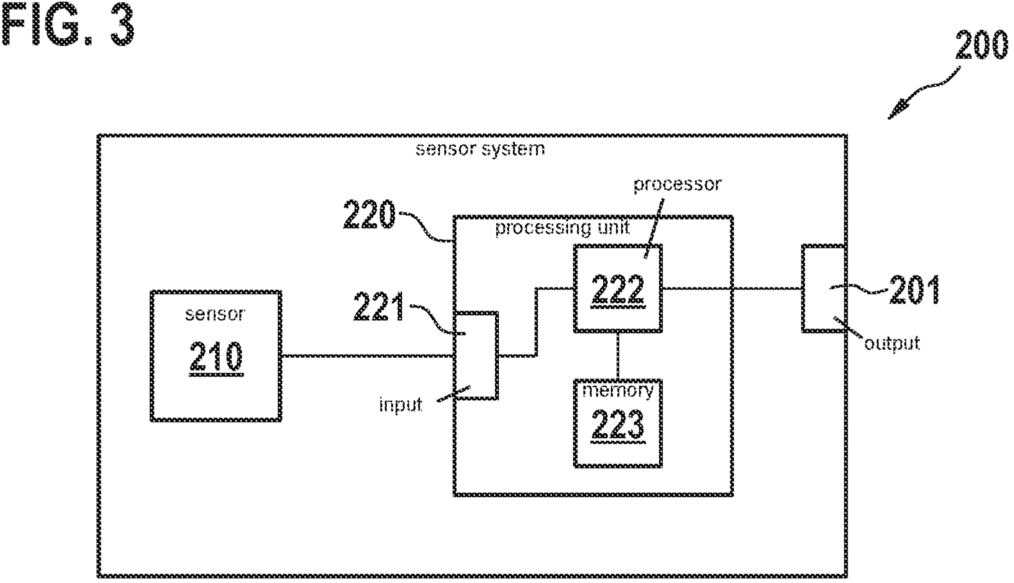
FIG. 3 schematically shows a sensor system including a processing unit and a sensor, according to an example embodiment of the present invention.

FIG. 3 shows a sensor system 200 including a sensor 210 and a processing unit 220. Processing unit 220 includes an input 221, sensor 210 being connected at input 221 and measured data of sensor 210 being able to be read in via input 221. Processing unit 220 further includes a processor 222 and a memory 223. A general sensor model optimized using the method explained in conjunction with FIG. 1 and FIG. 2 may be stored in memory 223. Such an optimized general sensor model is stored, in particular, in memory 223. The processor is configured to process measured data of sensor 210 based on the general sensor model. Processor 222 may further be configured to output processed measured data via an output 201 of sensor system 200.

In one exemplary embodiment, processor 222 is further configured to carry out, based on measured data of sensor 210 received via input 221, an inner optimization, in which a sensor-specific sensor model is initialized using the general sensor model and a sensor-specific model parameter is subsequently optimized based on the measured data of sensor 210. Processor 222 is further configured to adapt the sensor-specific sensor model with the aid of the sensor-specific model parameter and to store it in memory 223. For this purpose, processing unit 220 or processor 222 may include a microcontroller.

FIG. 4 shows a flowchart 100 of a further method for calibrating a sensor of a sensor system, which corresponds to the method explained in conjunction with FIG. 1 to the extent that no differences are described below. Model parameter steps 131, 132, 133 differ in the method of FIG. 4 from the method of FIG. 1. First model parameter step 131 includes a first supervised model parameter step 134 and a first unsupervised model parameter step 135. Second model parameter step 132 includes a second supervised model parameter step 136 and a second unsupervised model parameter step 137. Third model parameter step 133 includes a third supervised model parameter step 138 and a third unsupervised model parameter step 139. Supervised model parameter steps 134, 136, 138 in this case may correspond to the supervised model parameter steps explained in conjunction with FIG. 1. Unsupervised model parameter steps 135, 137, 139 in this case may correspond to the unsupervised model parameter steps explained in conjunction with FIG. 1.

The following formula may be used here to determine the loss function $L_{Ti,C}^{inner}$:

$$L_{Ti,C^{inner}} = \lambda_1 L_{Ti,DC^{inner,unsupervised}} + \lambda_2 L_{Ti,DC^{inner,supervised}}$$

$\lambda_1$ and $\lambda_2$ in this case may be weighting factors. Thus, a model parameter step without a supervised model parameter step is also possible. Calibration step 180 in FIG. 2 may thus be supervised, unsupervised or implemented based on a combination of both.

Figure 5:
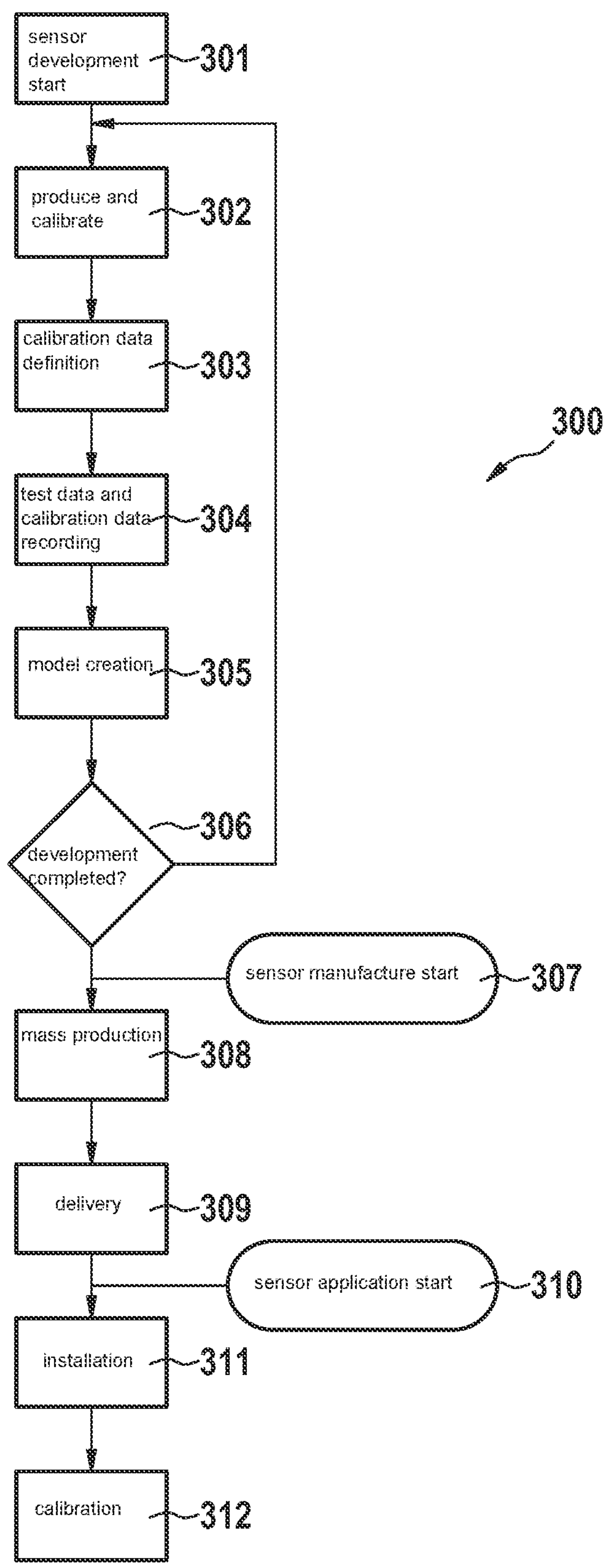
FIG. 5 schematically shows a general overview of a development process, a manufacturing process and an application process of a sensor system, according to an example embodiment of the present invention.

FIG. 5 shows a general overview 300 of a development process, a manufacturing process and an application process of a sensor system 200. After a sensor development start 301, sensors are produced and calibrated in a sensor prototype manufacture 302. In a subsequent calibration data definition 303, calibration data for an adaptation and for application conditions are defined. In a test data and calibration data recording 304, the base test data and the calibration data are recorded. The general sensor model is subsequently generated and optimized in model creation 305, for example, using the method explained in conjunction with FIG. 1. In a development termination decision 306, it is decided whether the development is completed. If the development is not completed, sensor prototype manufacture 302, calibration data definition 303, test data and calibration data recording 304 as well as model creation 305 are repeated and a renewed development termination decision 306 is made. If it is decided in a development termination decision 306 that the development is completed, a sensor manufacture start 307 takes place with a mass production 308 of sensors 210 or of sensor systems 200. Delivery 309 as well as sensor application start 310 subsequently takes place. Installation 311 of sensors 210 or sensor systems 200 then takes place. Sensors 210 or sensor systems 200 are subsequently calibrated in a calibration 312, for example, using the method explained in conjunction with FIG. 2.

Although the present invention has been explained in detail by the preferred exemplary embodiments, the present invention is not limited to the described examples and other variations thereof may be derived by those skilled in the art without departing from the scope of protection of the present invention.

What is claimed is:

1. A method for calibrating a sensor of a sensor system, comprising the following steps:

providing a plurality of sensors structurally identical to the sensor;

providing a general sensor model;

carrying out an inner optimization step for each structurally identical sensor of the structurally identical sensors, wherein, for each structurally identical sensor, a sensor-specific sensor model is initialized in the inner optimization step using the general sensor model and a sensor-specific model parameter is subsequently optimized based on measured data of the structurally identical sensor, the sensor-specific sensor model being adapted using the sensor-specific model parameter and an evaluation loss value being subsequently calculated for the sensor-specific sensor model;

carrying out an outer optimization step, evaluation loss values calculated for each of the structurally identical sensors being used in order to optimize a general model parameter of the general sensor model by minimizing a loss function indicative of sensor errors across the structurally identical sensors; and storing the optimized general sensor model in a memory of the sensor system.

2. The method as recited in claim 1, wherein after installation of the sensor system, an inner optimization step is carried out, a sensor-specific sensor model of the sensor being initialized during the inner optimization step using the general sensor model and a sensor-specific model parameter for the sensor being subsequently optimized based on measured data of the sensor, the sensor-specific sensor model of the sensor being adapted using the sensor-specific model parameter for the sensor, the sensor-specific sensor model of the sensor being stored in the memory.

3. The method as recited in claim 2, wherein the general sensor model and/or an adaptation algorithm is subsequently removed from the memory.

4. The method as recited in claim 1, wherein implementation of the inner optimization step and implementation of the outer optimization step are repeated using the optimized general sensor model.

5. The method as recited in claim 1, wherein during the inner optimization step, the measured data are calibration data and a loss function of a sensor error is taken into consideration for optimizing the sensor-specific model parameter.

6. The method as recited in claim 1, wherein measured data of the respective structurally identical sensor are used in calculating the evaluation loss value, the measured data being base test data, or calibration data and base test data.

7. The method as recited in claim 1, wherein the inner optimization step and/or the outer optimization step takes place using a neural network.

8. A processing unit for a sensor system, the processing unit comprising:

an input for measured data of a sensor, a processor and a memory, a optimized general sensor model being stored in the memory, and the processor being configured to process measured data of the sensor based on the general sensor model, the general sensor model being optimized by:

providing a plurality of sensors structurally identical to the sensor;

providing a general sensor model;

carrying out an inner optimization step for each structurally identical sensor of the structurally identical sensors, wherein, for each structurally identical sensor, a sensor-specific sensor model is initialized in the inner optimization step using the general sensor model and a sensor-specific model parameter is subsequently optimized based on measured data of the structurally identical sensor, the sensor-specific sensor model being adapted using the sensor-specific model parameter and an evaluation loss value being subsequently calculated for the sensor-specific sensor model;

carrying out an outer optimization step, evaluation loss values calculated for each of the structurally identical sensors being used in order to optimize a general model parameter of the general sensor model by minimizing a loss function indicative of sensor errors across the structurally identical sensors; and storing the optimized general sensor model in the memory.

9. The processing unit as recited in claim 8, wherein the processor is further configured to carry out an inner optimization based on measured data of the sensor received via the input, in which a sensor-specific sensor model of the sensor is initialized using the general sensor model and a sensor-specific model parameter for the sensor is subsequently optimized based on the measured data of the sensor, the sensor-specific sensor model being adapted using the sensor-specific model parameter for the sensor and being stored in the memory.

10. A sensor system, comprising:

a sensor; and a processing unit including:

an input for measured data of the sensor, a processor and a memory, a optimized general sensor model being stored in the memory, and the processor being configured to process measured data of the sensor based on the general sensor model, the general sensor model being optimized by:

providing a plurality of sensors structurally identical to the sensor;

providing a general sensor model;

carrying out an inner optimization step for each structurally identical sensor of the structurally identical sensors, wherein, for each structurally identical sensor, a sensor-specific sensor model is initialized in the inner optimization step using the general sensor model and a sensor-specific model parameter is subsequently optimized based on measured data of the structurally identical sensor, the sensor-specific sensor model being adapted using the sensor-specific model parameter and an evaluation loss value being subsequently calculated for the sensor-specific sensor model;

carrying out an outer optimization step, evaluation loss values calculated for each of the structurally identical sensors being used in order to optimize a general model parameter of the general sensor model by minimizing a loss function indicative of sensor errors across the structurally identical sensors; and storing the optimized general sensor model in the memory.

* * * * *